Patented Feb. 21, 1950

2,498,252

UNITED STATES PATENT OFFICE 2,498,252

BIGUANIDE COMPOUNDS

Francis Henry Swinden Curd and Francis Leslie Rose, Blackley, Manchester, England, assignors to Imperial Chemical Industries Limited, a corporation of Great Britain No Drawing. Application June 19, 1947, Serial No. 755,711

12 Claims. (Cl. 260—565)

This invention relates to new compounds and more particularly it relates to compounds which are useful as anti-malarial agents. The present application is a continuation-in-part of copending applications Serials Nos. 710,094 and 720,096.

An object of the present invention is to provide new compounds having chemotherapeutic properties and being useful in the treatment of malaria. Other and further important objects of this invention will appear as the description proceeds.

These objects are attained by the present invention according to which there are provided new biguanide derivatives of the general formula

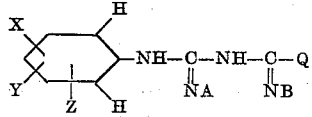

wherein X and Y represent atoms or radicals selected from the group consisting of hydrogen, halogen and alkyl radicals of 1–3 carbon atoms, Z represents an atom selected from the group consisting of chlorine, bromine and iodine, A represents an atom or radical selected from the group consisting of hydrogen and an alkyl radical of 1–3 carbon atoms, B represents an alkyl radical of 1–3 carbon atoms and Q represents the radical of a nitrogenous base selected from the group consisting of monoalkylamines and dialkylamines, provided that the number of carbon atoms contained in Q is more than one and fewer than 8.

Those of the new biguanide derivatives wherein A is hydrogen may be made for example by the method described in copending application Serial No. 701,094, viz. by causing a substituted dicyandiamide of the formula:

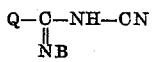

wherein Q and B have the significance stated above, to react with an arylamine of the formula:

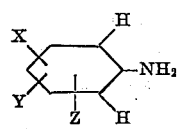

wherein X, Y, and Z have the significance stated above.

This reaction may be brought about conveniently by heating the substituted dicyandiamide with a salt, for example the hydrochloride, of the arylamine in presence of a solvent, conveniently for example water or other hydroxylic solvent for example β-ethoxyethanol.

Alternatively the new biguanides may also be made by the process of copending application Serial No. 720,096, that is, by interaction of an amine compound QH with either an S-substituted guanylisothiourea of the formula:

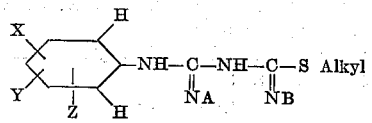

or with a guanylthiourea of the formula:

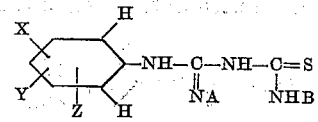

in the presence of a desulphurising agent such as the oxides and salts of heavy metals, particularly for example those of lead, copper, silver and mercury. In all of these formulae Q, X, Y, Z, A and B have the significance stated above. By a variation of this process the biguanide derivatives of the present invention may be made by the interaction of an amine compound

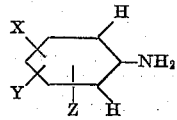

with an S-substituted guanylisothiourea of the formula:

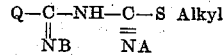

or with a guanylthiourea of the formula:

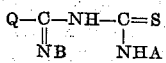

in the presence of a desulphurising agent. In all of these formulae also the symbols Q, X, Y, Z, A and B have the significance stated above.

The reaction in these processes may be brought about by heating the reagents together. Conveniently this may be carried out in presence of a solvent or diluent, advantageously a hydroxylic organic solvent, for example methanol, ethanol or β-ethoxyethanol. Alternatively an excess of the amino compound, when that is liquid, may be used as the solvent or diluent. The guanylthiourea, or the corresponding S-alkylguanylisothiourea, may be used as such or it may be used in the form of its salts, for example the hydrochloride. In the latter event the free thiourea may be liberated in situ by the addition of, as basifying agent, an equivalent amount of for example sodium ethoxide or sodium methoxide. Again the basifying agent may, if desired, be merely an excess of the amino compound.

Alternatively again the new biguanide derivatives of the present invention may be made by the process described and claimed in copending application Serial No. 723,450, viz. by interaction of a guanidine derivative of the formula:

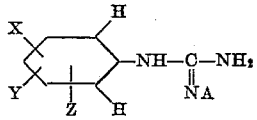

with, either an S-substituted isothiourea of the formula:

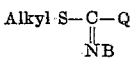

or with a thiourea of the formula:

in presence of a desulphurising agent in all of which formulae the symbols X, Y, Z, A, B and Q have the significance stated above, or, alternatively, by interaction of a guanidine derivative of the formula:

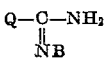

with an S-substituted isothiourea of the formula:

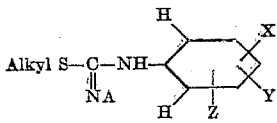

or with a thiourea of the formula:

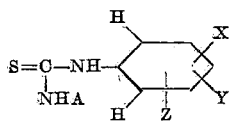

in the presence of a desulphurising agent, in all of which formulae the symbols X, Y, Z, A, B and Q have the significance stated above.

These processes may be brought about by heating the reactants together. Conveniently this is carried out in presence of a solvent or diluent, advantageously a hydroxylic organic solvent for example methanol, ethanol or β-ethoxyethanol. The thiourea, or the corresponding S-alkylisothiourea, may be used as such or it may be used in the form of its salts, for example the hydrochloride. In the latter event the thiourea may be liberated in situ by the addition of, as basifying agent, an equivalent amount of, for example, sodium ethoxide or sodium methoxide.

The novel compounds of this invention are all characterised by a common structure, as expressed by the above general formula, and by substantially common physical and chemical characteristics. Outstanding among their properties is the pharmaceutical property of being excellent antimalarial agents. Our novel compounds thus constitute synthetic substitutes for quinine. While the degree of efficacy as an antimalarial agent will, of course, vary from one individual compound to the next, we have tested so large a number of members of the general class against avian malaria that it may safely be postulated that all the compounds of the class have antimalarial properties.

Among the numerous compounds already tested against *Plasmodium gallinaceum* infection of chicks the following substances have been found to be active against both the erythrocytic and exo-erythrocytic forms of the parasite:

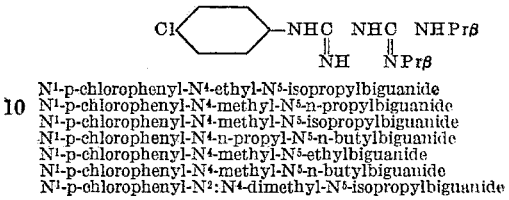

$N^1$-p-chlorophenyl-$N^4$-ethyl-$N^5$-isopropylbiguanide
$N^1$-p-chlorophenyl-$N^4$-methyl-$N^5$-n-propylbiguanide
$N^1$-p-chlorophenyl-$N^4$-methyl-$N^5$-isopropylbiguanide
$N^1$-p-chlorophenyl-$N^4$-n-propyl-$N^5$-n-butylbiguanide
$N^1$-p-chlorophenyl-$N^4$-methyl-$N^5$-ethylbiguanide
$N^1$-p-chlorophenyl-$N^4$-methyl-$N^5$-n-butylbiguanide
$N^1$-p-chlorophenyl-$N^2$:$N^4$-dimethyl-$N^5$-isopropylbiguanide

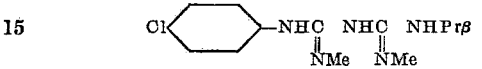

Other specific compounds of this invention include:

$N^1$-p-bromophenyl-$N^4$-methyl-$N^5$-isopropylbiguanide
$N^1$-p-bromophenyl-$N^4$-ethyl-$N^5$-isopropylbiguanide
$N^1$-p-bromophenyl-$N^4$-methyl-$N^5$-ethylbiguanide
$N^1$-p-bromophenyl-$N^4$-methyl-$N^5$-n-butylbiguanide
$N^1$-p-iodophenyl-$N^4$-methyl-$N^5$-isopropylbiguanide
$N^1$-m-chlorophenyl-$N^4$-ethyl-$N^5$-isopropylbiguanide
$N^1$-m-bromophenyl-$N^4$-methyl-$N^5$-isopropylbiguanide
$N^1$-m-iodophenyl-$N^4$-methyl-$N^5$-isopropylbiguanide
$N^1$-3:4-dichlorophenyl-$N^4$-methyl-$N^5$-isopropylbiguanide
$N^1$-3:4-dichlorophenyl-$N^4$-methyl-$N^5$-n-propylbiguanide
$N^1$-3:4-dichlorophenyl-$N^4$-methyl-$N^5$-n-butylbiguanide
$N^1$-3:4-dichlorophenyl-$N^4$-ethyl-$N^5$-isopropylbiguanide
$N^1$-3:4-dichlorophenyl-$N^4$-methyl-$N^5$-ethylbiguanide
$N^1$-3-chloro-4-bromophenyl-$N^4$-methyl-$N^5$-isopropylbiguanide
$N^1$-3-chloro-4-iodophenyl-$N^4$-methyl-$N^5$-isopropylbiguanide
$N^1$-3-bromo-4-chlorophenyl-$N^4$-methyl-$N^5$-isopropylbiguanide
$N^1$-3:4-dibromophenyl-$N^4$-methyl-$N^5$-isopropylbiguanide
$N^1$-3-bromo-4-iodophenyl-$N^4$-methyl-$N^5$-isopropylbiguanide
$N^1$-3-iodo-4-chlorophenyl-$N^4$-methyl-$N^5$-isopropylbiguanide
$N^1$-3-iodo-4-bromophenyl-$N^4$-methyl-$N^5$-isopropylbiguanide
$N^1$-3:4-diiodophenyl-$N^4$-methyl-$N^5$-isopropylbiguanide
$N^1$-4-chloro-3-methylphenyl-$N^4$-methyl-$N^5$-n-butylbiguanide
$N^1$-4-bromo-3-methylphenyl-$N^4$-methyl-$N^5$-ethylbiguanide
$N^1$-4-iodo-3-methylphenyl-$N^4$-ethyl-$N^5$-isopropylbiguanide
$N^1$-3-chloro-4-methylphenyl-$N^4$-methyl-$N^5$-n-propylbiguanide
$N^1$-3-bromo-4-methylphenyl-$N^4$-methyl-$N^5$-isopropylbiguanide
$N^1$-3-iodo-4-methylphenyl-$N^4$-methyl-$N^5$-ethylbiguanide.

All these substances may be made by one or more of the methods hereinbefore set forth.

The new compounds are strong bases; they form stable salts with organic and inorganic acids which in many cases are freely soluble in water. The salts may be made by treating the biguanides in water with the appropriate acid and then removing the water, but they are more conveniently obtained in a dry form by mixing the components together in an organic solvent such as for example acetone, or an alcohol, in which the salt is sparingly soluble. For use chemotherapeutically it is frequently an advantage to apply the new compounds in the form of their salts, especially those salts which are water-soluble. For this purpose there may be used for example the acetates, propionates, butyrates, crotonates, formates, malonates, succinates, glycollates, tartrates, citrates, hydrochlorides, nitrates, sulphates, lactates, methanesulphonates, methylenedisalicylates or the methylene-bis-β-hydroxynaphthoates or glycine salts, but it will be understood that many other salts may equally be used, it being understood that for use in the treatment of human malaria it is not desirable to use the salt of an acid which, of itself, possesses toxic properties.

The following examples illustrate but do not limit the invention. The parts are by weight.

*Example 1*

A mixture of 16.8 parts of $N^2$:$N^3$-diisopropyldicyandiamide, 24.6 parts of p-chloroaniline hydrochloride and 150 parts of water is heated to boiling under reflux. A little β-ethoxyethanol is added to give complete solution and the mixture is boiled for 3 hours. It is then allowed to cool and the crystals which separate are filtered off and washed with water. They are then dissolved in cold 2N hydrochloric acid, the solution is filtered and the filtrate is treated with ammonium hydroxide until only just acid to Congo red. The precipitate is filtered off, washed with water and recrystallised from water. There is thus obtained $N^1$ - p-chlorophenyl - $N^4$:$N^5$-diisopropylbiguanide hydrochloride, which melts at 254° C.

Example 2

A mixture of 15.4 parts of $N^2$-ethyl-$N^3$-isopropyldicyandiamide, 18 parts of p-chloroaniline hydrochloride and 100 parts of water is heated under reflux for 3 hours. It is then allowed to cool and the crystals which separate are filtered off, washed with water and dried. They are then slurried with a little ethyl acetate, filtered off and washed with ethyl acetate; they are then dissolved in hot water and the solution is clarified by refluxing for 10 minutes with decolourising carbon, then filtered and allowed to cool. The crystals which separate are filtered off, washed and dried. There is then obtained $N^1$-p-chlorophenyl - $N^4$ - ethyl-$N^5$-isopropylbiguanide hydrochloride which melts at 234–5° C.

In like manner to that described in Example 2, using approximately 1 molecular proportion of the appropriate $N^2$:$N^3$-dialkyldicyandiamide and 1.1 to 1.5 molecular proportions of p-chloroaniline hydrochloride, there are obtained:

Example 3

$N^1$ - p-chlorophenyl-$N^4$-n-propyl-$N^5$-isopropylbiguanide hydrochloride, M. P. 235–6° C.

Example 4

$N^1$-p-chlorophenyl - $N^4$ - methyl - $N^5$ - ethylbiguanide hydrochloride, M. P. 215° C.

Example 5

$N^1$ -p-chlorophenyl -$N^4$-methyl -$N^5$-n-butylbiguanide hydrochloride, M. P. 175–6° C.

Example 6

A mixture of 19.4 parts of $N^2$-isopropyl-$N^3$-cyclohexyl-dicyandiamide, 24.6 parts of p-chloroaniline hydrochloride, 200 parts of water and 100 parts of β-ethoxyethanol is heated under reflux for 3 hours. It is then allowed to cool and the crystals which are deposited are filtered off and washed with water. They are then dissolved in hot β-ethoxyethanol, the solution is clarified by boiling for 15 minutes with decolourising carbon, then filtered and allowed to cool. The crystals which separate are filtered off, washed and dried. There is thus obtained $N^1$-p-chlorophenyl - $N^4$ - isopropyl - $N^5$ - cyclohexylbiguanide hydrochloride, which melts at 238–9° C.

Example 7

27 parts of $N^1$-p-chlorophenylguanyl-$N^2$-n-propylthiourea (M. P. 108° C., made by interaction of p-chlorophenylguanidine and n-propylisothiocyanate), 33.8 parts of methylamine hydrochloride, 27 parts of sodium methoxide and 75 parts of methanol are mixed and 43 parts of mercuric oxide are added. The mixture is stirred at room temperature for 16 hours and then the insoluble matter is filtered off and the filtrate is evaporated to dryness under diminished pressure. The residue is extracted with ethyl acetate and the extract is evaporated to dryness. The solid so obtained is dissolved in an excess of cold 7% hydrochloric acid and an aqueous 4% solution of sodium hydroxide is added until the mixture is no longer acid to Congo red. A precipitate forms and is filtered off, washed with water and recrystallised from water. It is $N^1$-p-chlorophenyl - $N^4$ - methyl-$N^5$-n-propylbiguanide hydrochloride which has M. P. 164° C.

Example 8

27 parts of $N^1$-p-chlorophenylguanyl-$N^2$-n-propylthiourea, 30 parts of n-butylamine, 43 parts of mercuric oxide and 75 parts of methanol are mixed and stirred together at room temperature for 16 hours. The insoluble inorganic material is filtered off and the filtrate is evaporated to dryness under diminished pressure. The residue is dissolved in an excess of hot 7% hydrochloric acid and the solution is cooled and filtered. 4% caustic soda solution is then added to the filtrate until the mixture is no longer acid to Congo red. A solid is precipitated, filtered off and recrystallised from water. This is $N^1$-p-chlorophenyl-$N^4$ - n - propyl-$N^5$-n-butylbiguanide hydrochloride which has M. P. 163–164° C.

Example 9

7.0 parts of $N^1$-(N-p-chlorophenyl-N'-methylguanyl)-$N^2$-isopropylthiourea hydrochloride, 10.0 parts of mercuric oxide, 21.0 parts of a 21% solution of methylamine in water and 50 parts of ethanol are stirred together at 30–35° C. for 20 hours. The mixture is then acidified with 7% hydrochloric acid and sodium sulphide is added until no more mercuric sulphide is precipitated. The mixture is filtered and the filtrate is made strongly alkaline with 40% sodium hydroxide solution. The precipitated base is extracted with benzene, and the benzene solution is shaken with 7% hydrochloric acid. The solution is clarified, and made neutral to litmus with ammonia. Brine is added to complete the precipitation of the hydrochloride which is filtered off, washed with brine, dried and crystallised from a mixture of ethanol and ethyl acetate. There are thus obtained colourless crystals of $N^1$-p-chlorophenyl-$N^2$:$N^4$ - dimethyl - $N^5$ - isopropylbiguanide hydrochloride, with M. P. 177–178° C.

Example 10

2.0 parts of $N^1$-(N-p-chlorophenyl-$N^1$-ethylguanyl)-$N^2$-isopropylthiourea (prepared by reacting N-p-chlorophenyl-N'-ethylguanidine with isopropyl isothiocyanate, M. P. 132–3° C.), 4.0 parts of mercuric oxide and 25 parts of a 21% solution of methylamine in water and 50 parts of ethanol are stirred together at room temperature for 20 hours. The mixture is treated as described in Example 9, to give $N^1$-p-chlorophenyl-$N^4$-methyl - $N^2$ - ethyl-$N^5$-isopropylbiguanide hydrochloride which crystallises as colourless crystals from a mixture of ethanol and ethyl acetate, M. P. 152° C.

Example 11

Using an aqueous alcoholic solution of ethylamine in place of the methylamine used in the preceding example colourless crystals of $N^1$-p-chlorophenyl-$N^2$:$N^4$-diethyl-$N^5$ -isopropylbiguanide hydrochloride, M. P. 145–146° C., are obtained.

While it will be understood that medical utility in the treatment of human malaria may formally be asserted only after extensive clinical trials, it has been found that in this class of compounds the efficacy of a substance in avian malaria, particularly in *Plasmodium gallinaceum* infection in chicks, is a good indication of its utility in the treatment of human malaria. Moreover, efficacy against the exo-erythrocytic forms of avian malaria organisms in this class of compounds is generally indicative of utility as a causal prophylactic in human malaria. Utility as a causal prophylactic is a very desirable feature of an antimalarial agent and this feature is not possessed by quinine. Quinine is merely curative and, to a degree, clinically prophylactic, these properties being generally indicated by efficacy against the erythrocytic forms in avian malaria. Thus the compounds of the present invention possess generally a very important advantage in comparison with quinine. Also, being colourless, they do not possess undesirable property of staining the skin of the patient.

Moreover, as indicated above, the compounds of the present invention are readily made by a number of relatively simple chemical processes and from cheap, or potentially cheap starting materials. In this they show a clear advantage over many already-known synthetic antimalarial agents, notably over Mepacrine which is 2-chloro-5($\omega$-diethylamino-$\alpha$-methylbutylamino)-7-methoxyacridine.

We claim:

1. A compound selected from the group consisting of the free base form and salts of the biguanides of the general formula:

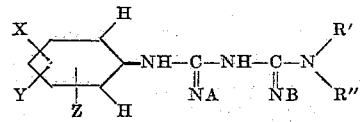

wherein A is a radical from the group consisting of hydrogen and 1 to 3 carbon atom alkyl; B is a 1 to 3 carbon atom alkyl radical; X and Y are radicals from the group consisting of hydrogen, halogen and 1 to 3 carbon atom alkyl; Z is the radical of a halogen atom of atomic weight greater than fluorine; R' is a lower alkyl radical; and R'' is a radical from the group consisting of hydrogen and lower alkyl, the sum of the carbon atoms in the radicals R' and R'' being between 1 and 8 inclusive.

2. A biguanide of the general formula:

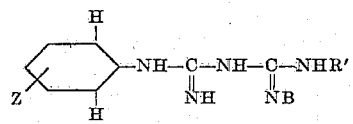

wherein B is a 1 to 3 carbon atom alkyl radical; R' is a lower alkyl radical and Z is a radical of a halogen atom of atomic weight greater than fluorine.

3. A biguanide of the general formula:

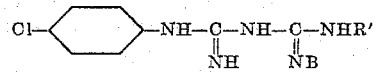

wherein B is a 1 to 3 carbon atom alkyl radical and R' is a lower alkyl radical.

4. A biguanide as claimed in claim 2 wherein B is a methyl radical.

5. A biguanide as claimed in claim 3 wherein R' is an isopropyl radical.

6. $N^1$-p-chlorophenyl-$N^4$-methyl-$N^5$-isopropyl biguanide.

7. $N^1$-p-chlorophenyl-$N^4$-ethyl-$N^5$-isopropyl biguanide.

8. $N^1$-p-chlorophenyl-$N^4$-methyl-$N^5$-n-butyl biguanide.

9. A biguanide of the general formula:

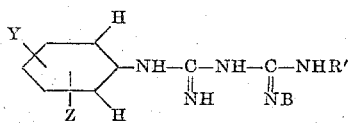

wherein B is a 1 to 3 carbon atom alkyl radical, R' is a lower alkyl radical and Y and Z are radicals of a halogen atom of atom weight greater than fluorine.

10. A biguanide of the general formula:

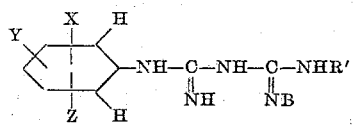

wherein B is a 1 to 3 carbon atom alkyl radical, R' is a lower alkyl radical, and X, Y and Z are radicals of a halogen atom of atomic weight greater than fluorine.

11. A biguanide as claimed in claim 9, wherein Z is a chlorine radical in the para-position.

12. A biguanide as claimed in claim 10, wherein Z is a chlorine radical in the para-position.

FRANCIS HENRY SWINDEN CURD.
FRANCIS LESLIE ROSE.

REFERENCES CITED

The following references are of record in the patented file of this patent:

FOREIGN PATENTS

| Number | Country | Date |
|---|---|---|
| 577,843 | Great Britain | June 13, 1946 |

OTHER REFERENCES

Curd et al., "Annals Tropical Med. and Parasitol," vol 39, December 31, 1945, page 208.